(12) United States Patent
Yamane et al.

(10) Patent No.: US 10,854,082 B2
(45) Date of Patent: Dec. 1, 2020

(54) DETERMINATION DEVICE AND DETERMINATION METHOD

(71) Applicant: Panasonic Intellectual Property Management Co., Ltd., Osaka (JP)

(72) Inventors: Ichiro Yamane, Kanagawa (JP); Takafumi Tokuhiro, Kanagawa (JP); Satoshi Fukumoto, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 109 days.

(21) Appl. No.: 16/074,794

(22) PCT Filed: Jan. 26, 2017

(86) PCT No.: PCT/JP2017/002637
§ 371 (c)(1),
(2) Date: Aug. 2, 2018

(87) PCT Pub. No.: WO2017/150021
PCT Pub. Date: Sep. 8, 2017

(65) Prior Publication Data
US 2019/0066511 A1    Feb. 28, 2019

(30) Foreign Application Priority Data
Mar. 1, 2016    (JP) .................. 2016-038850

(51) Int. Cl.
*G08G 1/16*    (2006.01)
*G09B 29/00*    (2006.01)
*G08G 1/01*    (2006.01)

(52) U.S. Cl.
CPC ............. *G08G 1/166* (2013.01); *G08G 1/01* (2013.01); *G08G 1/16* (2013.01); *G09B 29/00* (2013.01)

(58) Field of Classification Search
CPC . G08G 1/166; G08G 1/16; G08G 1/01; G09B 29/00
(Continued)

(56) References Cited

U.S. PATENT DOCUMENTS

| 2012/0185160 A1* | 7/2012 | Kumabe | G08G 1/164 |
| | | | 701/301 |
| 2013/0322692 A1 | 12/2013 | Guan | |
| 2019/0031198 A1* | 1/2019 | Aoki | B60W 50/0098 |

FOREIGN PATENT DOCUMENTS

| CN | 103455812 A | 12/2013 |
| JP | 2000-346657 | 12/2000 |
| JP | 2008-040736 A | 2/2008 |

OTHER PUBLICATIONS

International Search Report of PCT application No. PCT/JP2017/002637 dated Apr. 18, 2017.
(Continued)

*Primary Examiner* — Nadeem Odeh
(74) *Attorney, Agent, or Firm* — Greenblum & Bernstein, P.L.C.

(57) ABSTRACT

A determination device includes an input unit and a controller. The input unit receives information on a sidewalk area and information on a target object recognized in the sidewalk area. The sidewalk area exists between a position where a vehicle is present and a non-sidewalk area. The controller (i) divides the sidewalk area into a plurality of partial areas including at least a first partial area and a second partial area based on the information on the sidewalk area, the first partial area being closest to the vehicle among the plurality of partial areas, and the second partial area being adjacent to the non-sidewalk area, and (ii) determines, based on the information on the target object, at least one
(Continued)

partial area among the plurality of partial areas to be a range where the vehicle is allowed to enter.

9 Claims, 9 Drawing Sheets

(58) Field of Classification Search
USPC .................................................. 701/117, 301
See application file for complete search history.

(56) References Cited

OTHER PUBLICATIONS

Chinese Office Action from the China National Intellectual Property Administration (CNIPA) dated Jul. 28, 2020 for the related Chinese Patent Application No. 201780013695.9, together with an English language translation.
Japanese Office Action from the Japan Patent Office (JPO) dated Sep. 15, 2020 for the related Japanese Patent Application No. 2019-173884.

* cited by examiner

DETERMINATION DEVICE AND DETERMINATION METHOD

This application is a U.S. national stage application of the PCT International Application No. PCT/JP2017/002637 filed on Jan. 26, 2017, which claims the benefit of foreign priority of Japanese patent application 2016-038850 filed on Mar. 1, 2016, the contents all of which are incorporated herein by reference.

TECHNICAL FIELD

The present disclosure relates to a determination device and a determination method that make determinations relating to traveling of a moving object.

BACKGROUND ART

In recent years, various driving assistance techniques have been developed for assisting drivers of vehicles. In one of such techniques, for example, when a vehicle approaches an intersection, an area near the intersection is divided into a plurality of areas and a predetermined mark is shown in a area of the divided areas, where a pedestrian is present, so that a driver recognizes a position of the pedestrian (for example, see PTL 1).

CITATION LIST

Patent Literature

PTL 1: Unexamined Japanese Patent Publication No. 2000-346657

SUMMARY OF THE INVENTION

A determination device according to an aspect of the present disclosure includes an input unit and a controller. The input unit receives information on a sidewalk area and information on a target object recognized in the sidewalk area. The sidewalk area exists between a position where a vehicle is present and a non-sidewalk area. The controller (i) divides the sidewalk area into a plurality of partial areas including at least a first partial area and a second partial area based on the information on the sidewalk area, the first partial area being closest to the vehicle among the plurality of partial areas, and the second partial area being adjacent to the non-sidewalk area, and (ii) determines, based on the information on the target object, at least one partial area among the plurality of partial areas to be a range where the vehicle is allowed to enter.

A determination method according to an aspect of the present disclosure includes receiving information on a sidewalk area and information on a target object recognized in the sidewalk area. The sidewalk area exists between a position where a vehicle is present and a non-sidewalk area. The determination method further includes dividing the sidewalk area into a plurality of partial areas including at least a first partial area and a second partial area based on the information on the sidewalk area. The first partial area is closest to the vehicle among the plurality of partial areas, and the second partial area is adjacent to the non-sidewalk area. The determination method further includes determining, based on the information on the target object, at least one partial area among the plurality of partial areas to be a range where the vehicle is allowed to enter.

The present disclosure enables the vehicle to safely cross the sidewalk.

DESCRIPTION OF EMBODIMENT

Figure 1:
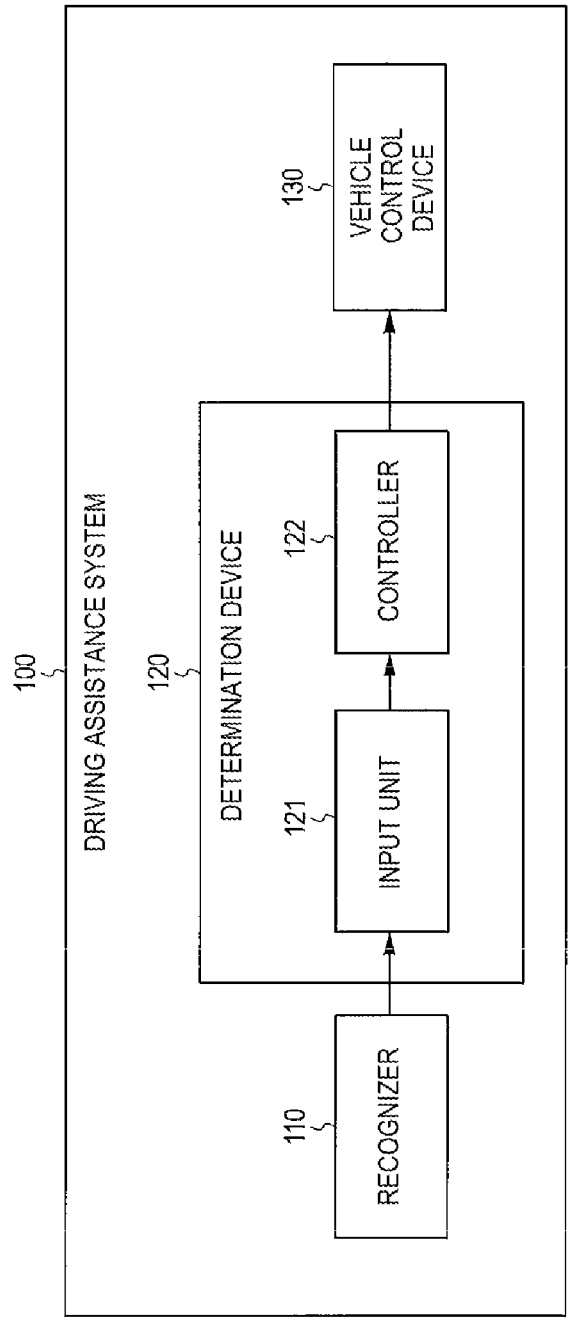
FIG. 1 is a block diagram of an example of a configuration of a driving assistance system and a determination device according to an exemplary embodiment of the present disclosure.

Prior to describing an exemplary embodiment of the present disclosure, problems found in a conventional technique will now be briefly described herein. In the technique of PTL 1, when a vehicle crosses a sidewalk to enter a roadway, driving assistance is not performed.

The present disclosure provides a determination device, a determination method, and a determination program that enable a vehicle to safely cross a sidewalk.

Hereinafter, an exemplary embodiment of the present disclosure will be described in detail with reference to the drawings. In the exemplary embodiment, like reference numerals are used to designate configurations having identical functions and thus redundant descriptions thereof will be omitted.

A configuration of driving assistance system 100 and determination device 120 according to the present exemplary embodiment is described first with reference to FIG. 1. FIG. 1 is a block diagram of an example of the configuration of driving assistance system 100 and determination device 120 according to the present exemplary embodiment. The present exemplary embodiment is described assuming that driving assistance system 100 is applied to a vehicle.

Driving assistance system 100 includes recognizer 110, determination device 120, and vehicle control device 130. Determination device 120 includes input unit 121 and controller 122.

Driving assistance system 100 also includes a detector (not shown). The detector is a sensor that is mounted inside or outside a vehicle compartment. Examples of the detector include a sensing camera, a laser sensor, and a millimeter-wave radar. The detector detects a surrounding environment of a vehicle (at least an environment in front of a vehicle) and outputs detection result information to recognizer 110. A detection technique of the detector is well-known in the art, and thus the detailed description thereof will be omitted.

Recognizer 110 recognizes a sidewalk area, a non-sidewalk area, and a predetermined target object present in the sidewalk area (for example, a pedestrian, a bicycle, or the like) based on the detection result information received from the detector. The non-sidewalk area is an area other than the sidewalk area, facing the sidewalk. Examples of the non-sidewalk area include a roadway, a garage, and a parking A specific example of the sidewalk area and the non-sidewalk area is described later with reference to FIG. 2.

A recognition process performed by recognizer 110 uses, for example, pattern matching or clustering depending on a type of the detection result information. A recognition technique of recognizer 110 is well-known in the art, and thus the detailed description thereof will be omitted.

Recognizer 110 outputs sidewalk area information, non-sidewalk area information, and target object information, which are recognition results, to input unit 121 of determination device 120. The sidewalk area information includes, for example, information about a relative position of a sidewalk area with respect to a non-sidewalk area and the like. The non-sidewalk area information includes information about a relative position of a non-sidewalk area with respect to a sidewalk area and the like. The target object information includes information about the type, position, and speed of a target object and the like.

Figure 2:
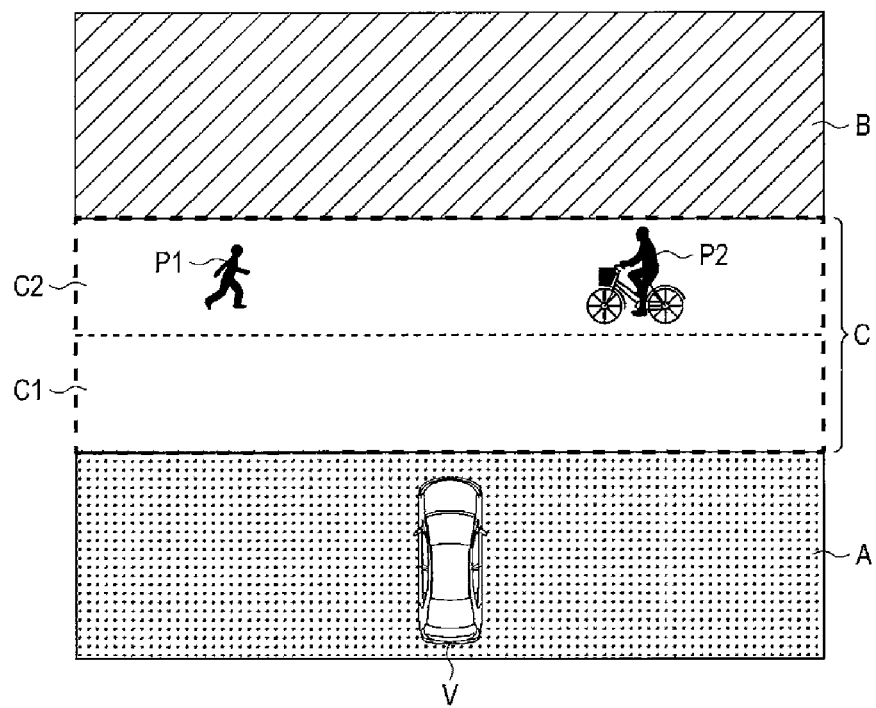
FIG. 2 shows an example of a sidewalk area, a non-sidewalk area, and a target object in the exemplary embodiment of the present disclosure.

An example of the sidewalk area, the non-sidewalk area, and the target object that are recognized by recognizer 110 is described with reference to FIGS. 1 and 2. FIG. 2 shows the sidewalk area and the non-sidewalk area as viewed from the top. However, the target object present in the sidewalk area is shown as viewed from the side.

In FIGS. 2, A and B denote the non-sidewalk area, and C denotes the sidewalk area. Non-sidewalk area A is, for example, a parking, a garage, or the like whereas non-sidewalk area B is, for example, a roadway. In the example of FIG. 2, vehicle V having driving assistance system 100 incorporated therein is present in non-sidewalk area A.

Sidewalk area C is interposed between non-sidewalk area A and non-sidewalk area B, and faces non-sidewalk areas A, B. In the example of FIG. 2, pedestrian P1 and biker (hereinafter, "bicycle") P2 are present in sidewalk area C.

Recognizer 110 mounted on vehicle V recognizes non-sidewalk area A, non-sidewalk area B, and sidewalk area C, and outputs the non-sidewalk area information about non-sidewalk areas A, B and the sidewalk area information about sidewalk area C to determination device 120.

In addition, recognizer 110 mounted on vehicle V recognizes pedestrian P1 and bicycle P2 on sidewalk area C and outputs the target object information about pedestrian P1 and bicycle P2 to determination device 120.

An example of the sidewalk area, the non-sidewalk area, and the target object that are recognized by recognizer 110 has been described above. FIG. 1 will be described again below.

Input unit 121 receives the sidewalk area information, the non-sidewalk area information, and the target object information from recognizer 110 and outputs these pieces of information to controller 122.

When receiving the sidewalk area information, the non-sidewalk area information, and the target object information from input unit 121, controller 122 performs various processes based on these pieces of information. For example, first, based on the sidewalk area information and the non-sidewalk area information, controller 122 divides the sidewalk area into a plurality of partial areas and recognizes the plurality of partial areas. Next, controller 122 determines a range a vehicle can cross among the partial areas based on the target object information.

A specific example of the process performed by controller 122 is described with reference to FIGS. 1 and 2. The following process is performed, for example, when vehicle V present in non-sidewalk area A crosses sidewalk area C to enter non-sidewalk area B.

Controller 122 first recognizes that sidewalk area C is interposed between non-sidewalk area A (that is to say, a current position of vehicle V) and non-sidewalk area B.

Next, controller 122 divides sidewalk area C into first partial area C1 that is closest to vehicle V and second partial area C2 that faces non-sidewalk area B, and recognizes first partial area C1 and second partial area C2. A number of divisions of sidewalk area C may be set in advance or may be determined by controller 122 based on a width of sidewalk area C (a length of sidewalk area C in a direction in which vehicle V crosses sidewalk area C, that is, a length of sidewalk area C in a crossing direction).

Next, controller 122 determines whether the target object is present in first partial area C1 and then in second partial area C2 (in ascending order).

That is, controller 122 determines first whether the target object is present in first partial area C1.

When the target object is present in first partial area C1, controller 122 determines that there is no range vehicle V can cross (that is to say, vehicle V cannot cross first partial area C1).

On the other hand, when the target object is not present in first partial area C1, controller 122 determines whether the target object is present in second partial area C2.

When the target object is present in second partial area C2, controller 122 determines that the range vehicle V can cross is first partial area C1 (that is to say, vehicle V can cross first partial area C1). In the case of FIG. 2, the target object is not present in first partial area C1 but is present in second partial area C2 (pedestrian P1 and bicycle P2). It is thus determined that the range vehicle V can cross is first partial area C1.

On the other hand, when the target object is not present in second partial area C2, controller 122 determines that the range vehicle V can cross is first partial area C1 and second partial area C2 (that is to say, vehicle V can cross second partial area C2).

A specific example of the process performed by controller 122 has been described above. FIG. 1 will be described again below.

Next, controller 122 outputs determination result information indicating the determination result (the range a vehicle can cross) to vehicle control device 130.

Vehicle control device 130 controls a device used in a vehicle. Examples of the device used in a vehicle include a traveling device and a display device.

A specific example when vehicle control device 130 controls a traveling device is described with reference to FIGS. 1 and 2.

For example, when the determination result information indicates that there is no range vehicle V can cross, vehicle control device 130 outputs a control signal to the traveling device to prohibit traveling of a vehicle. In response to the control signal, the traveling device controls the vehicle to prohibit traveling. Consequently, the vehicle cannot move forward from non-sidewalk area A to first partial area C1.

In addition, for example, when the determination result information indicates that the range vehicle V can cross is first partial area C1, vehicle control device 130 outputs a control signal to the traveling device to permit vehicle V to travel to first partial area C1. In response to the control signal, the traveling device controls vehicle V to permit traveling. Consequently, vehicle V can move forward to first partial area C1.

In addition, for example, when the determination result information indicates that the range vehicle V can cross is first partial area C1 and second partial area C2, vehicle control device 130 outputs a control signal to the traveling device to permit vehicle V to travel to second partial area C2. In response to the control signal, the traveling device controls vehicle V to permit traveling. Consequently, vehicle V can move forward to second partial area C2, thus entering non-sidewalk area B.

Next, a specific example when vehicle control device 130 controls a display device is described.

For example, when the determination result information indicates that there is no range vehicle V can cross, vehicle control device 130 outputs a control signal to the display device to generate an image showing such a state. In response to the control signal, the display device generates an image showing that vehicle V cannot enter first partial area C1 and outputs the image to a predetermined display medium. Consequently, a passenger of the vehicle can be informed that the vehicle cannot enter first partial area C1.

For example, when the determination result information indicates that the range vehicle V can cross is first partial area C1, vehicle control device 130 outputs a control signal to the display device to generate an image showing such a state. In response to the control signal, the display device generates an image showing that vehicle V can enter first partial area C1 and outputs the image to the predetermined display medium. Consequently, the passenger of the vehicle can be informed that vehicle V can enter first partial area C1.

For example, when the determination result information indicates that the range vehicle V can cross is first partial area C1 and second partial area C2, vehicle control device 130 outputs a control signal to the display device to generate an image showing such a state. In response to the control signal, the display device generates an image showing that vehicle V can enter first partial area C1 and second partial area C2, and outputs the image to the predetermined display medium. Consequently, the passenger of the vehicle can be informed that the vehicle can enter second partial area C2, thus entering non-sidewalk area B.

While the above description of controlling the display device has been made by using outputting of an image as an example, the present disclosure is not limited to this case. It is possible to use the means that enables the passenger of the vehicle to identify the contents of the determination result information (for example, outputting of voice, vibration of seats, or the like).

In addition, the operation of determination device 120 described above is effective in both automatic driving and manual driving.

The configuration of driving assistance system 100 and determination device 120 has been described above.

Figure 3:
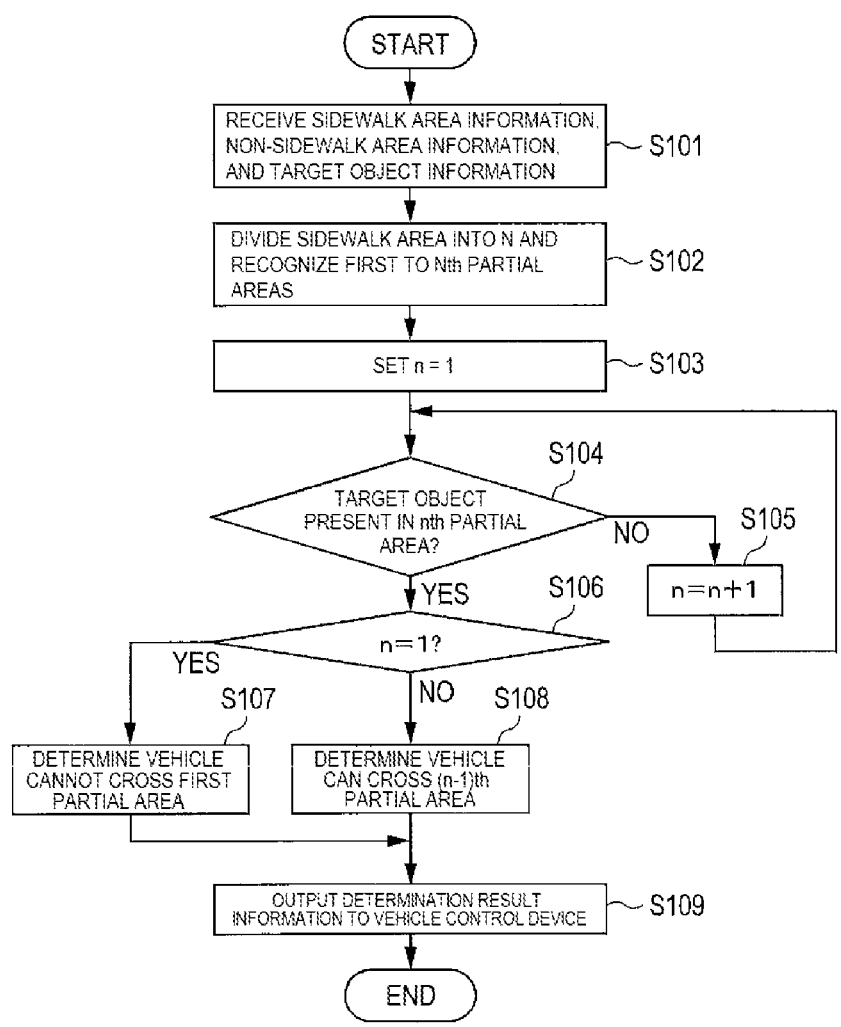
FIG. 3 is a flowchart of an example of a flow of operation of the determination device according to the exemplary embodiment of the present disclosure.

Next, a determination process of determination device 120 is described with reference to FIGS. 1 and 3. FIG. 3 is a flowchart of a flow of the determination process of determination device 120. This flow is performed, for example, when vehicle V present in non-sidewalk area A crosses sidewalk area C to enter non-sidewalk area B.

Input unit 121 receives sidewalk area information, non-sidewalk area information, and target object information from recognizer 110 (step S101). Input unit 121 then outputs these pieces of information received to controller 122.

Next, based on the sidewalk area information and the non-sidewalk area information received from input unit 121, controller 122 divides the sidewalk area into N (N is an integer of 2 or larger) partial areas and recognizes a first to Nth partial areas (step S102). The sidewalk area to be divided is interposed between a position where the vehicle is present and the non-sidewalk area (that is different from a non-sidewalk area including the position where the vehicle is present). A first partial area is closest to the position where the vehicle is present, whereas the Nth partial area faces the non-sidewalk area (that is different from the non-sidewalk area including the position where the vehicle is present).

Next, controller 122 sets a value n to 1, where n indicates a partial area functioning as a target for determining whether a target object is present (step S103).

Next, controller 122 determines whether the target object is present in an nth partial area (step S104).

When the target object is not present in the nth partial area (NO at step S104), controller 122 increments n (step S105) and makes a determination again at step S104.

On the other hand, when the target object is present in the nth partial area (YES at step S104), controller 122 determines whether n is equal to 1 (step S106).

When n is equal to 1 (YES at step S106), controller 122 determines that the vehicle cannot cross the first partial area (step S107).

When n is not equal to 1 (NO at step S106), controller 122 determines that the vehicle can cross a (n−1)th partial area (step S108).

Next, controller 122 outputs the determination result information to vehicle control device 130 (step S109).

The determination process of determination device 120 has been described above.

According to the exemplary embodiment of the present disclosure, a sidewalk area is recognized by being divided into a plurality of partial areas including at least a first partial area that is closest to a vehicle and a second partial area that faces a non-sidewalk area, and the range the vehicle can cross is determined among the partial areas based on information about a target object. When the vehicle crosses a sidewalk to move to a roadway, the vehicle can safely cross the sidewalk.

The scope of the present disclosure should not be limited to the exemplary embodiment described above, and various modifications are possible. The modifications will be described below.

(First Modification)

Figure 4:
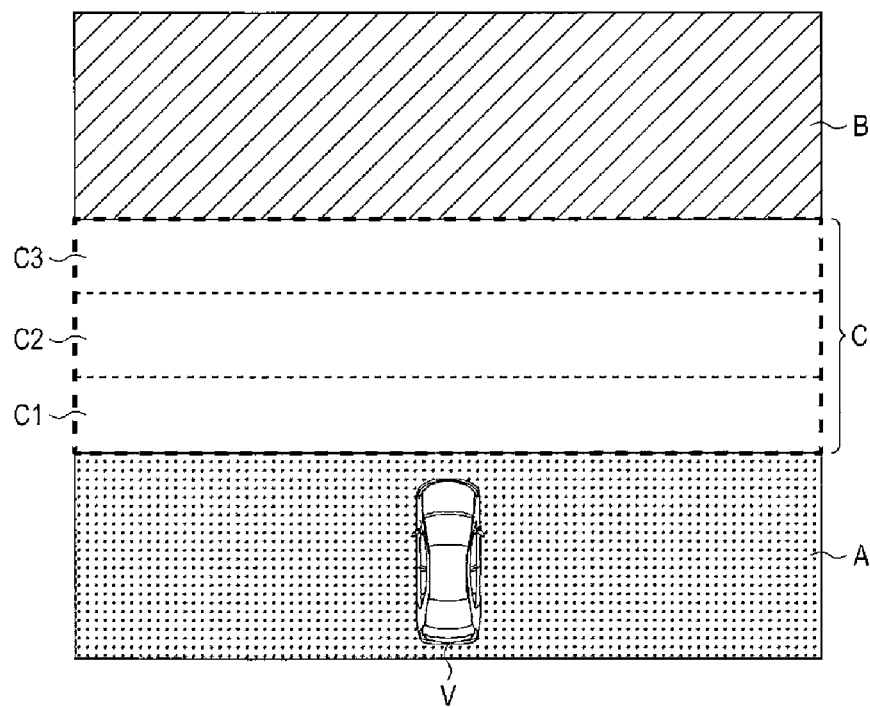
FIG. 4 shows an example of a plurality of partial areas in a first modification of the present disclosure.

While the exemplary embodiment has described a case where a sidewalk area is divided into two partial areas as an example, the sidewalk area may be divided into three or more partial areas. For example, as shown in FIG. 4, sidewalk area C may be divided into first partial area C1, second partial area C2, and third partial area C3. In this case, third partial area C3 faces non-sidewalk area B.

Figure 5:
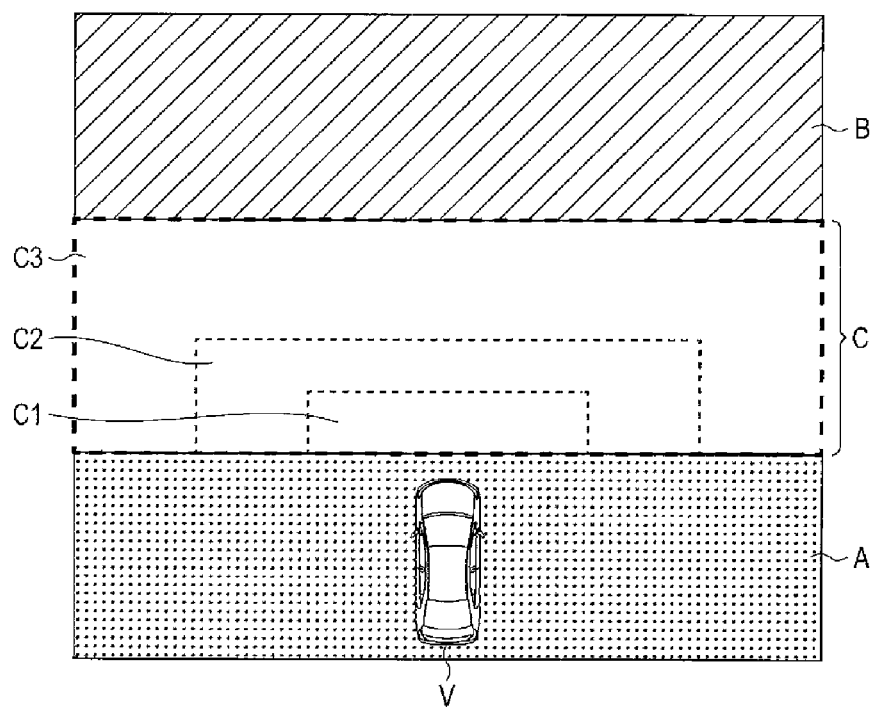
FIG. 5 shows another example of the partial areas in the first modification of the present disclosure.
Figure 6:
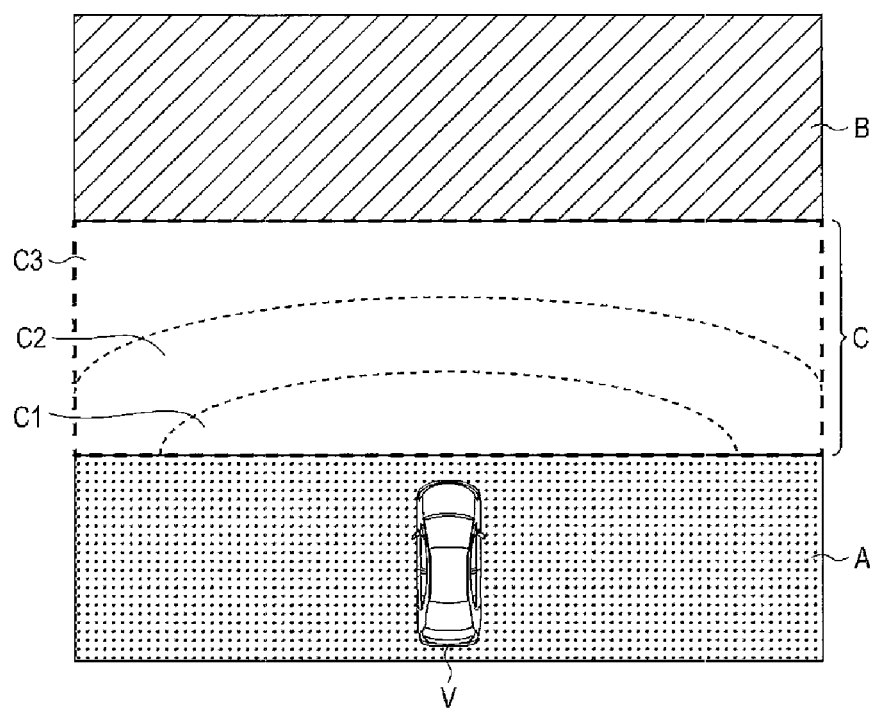
FIG. 6 shows yet another example of the partial areas in the first modification of the present disclosure.

Shapes and sizes of these partial areas are not necessarily identical. For example, as shown in FIG. 5 or FIG. 6, the shapes and sizes of first partial area C1, second partial area C2, and third partial area C3 may be different from each other.

(Second Modification)

While the exemplary embodiment has described, as an example, a case where a sidewalk area and a non-sidewalk area are recognized by recognizer 110, and recognizer 110 outputs sidewalk area information and non-sidewalk area information that are the result of recognition to input unit 121, the present disclosure is not limited to this case.

Figure 7:
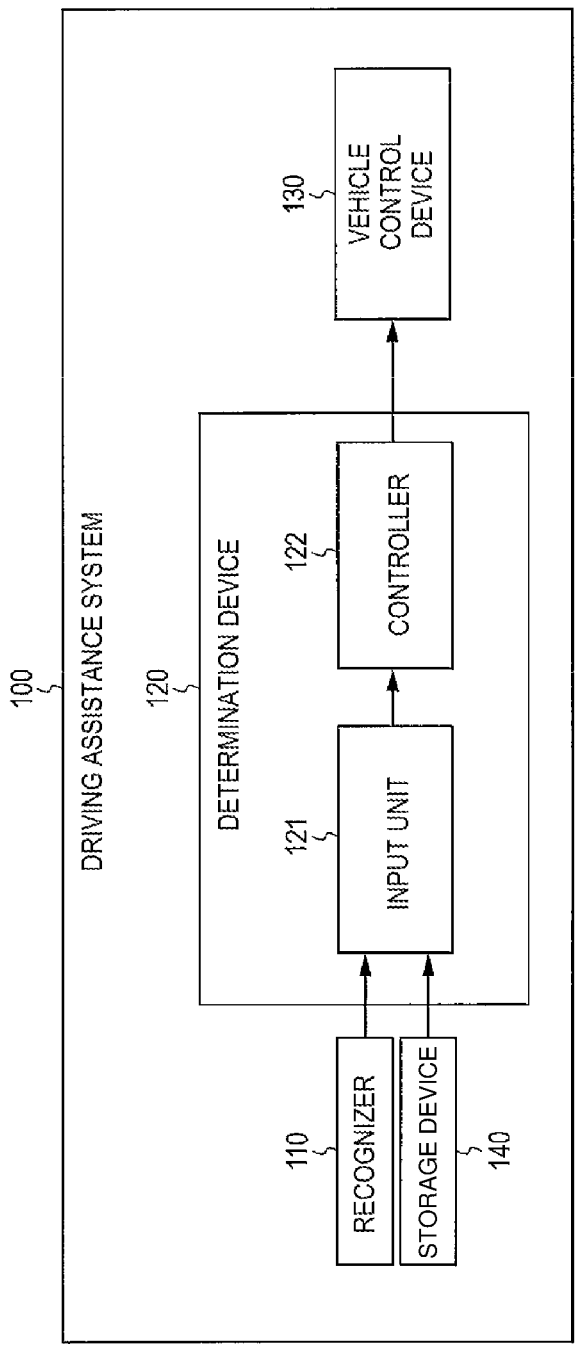
FIG. 7 is a block diagram of an example of a configuration of a driving assistance system according to a second modification of the present disclosure.

For example, as shown in FIG. 7, input unit 121 may receive sidewalk area information and non-sidewalk area information from storage device 140 that stores map database including the sidewalk area information and the non-sidewalk area information.

While storage device 140 is included in driving assistance system 100 in FIG. 7, storage device 140 may be provided outside driving assistance system 100. In this case, for example, driving assistance system 100 performs wireless communication with storage device 140 to receive the sidewalk area information and the non-sidewalk area information.

(Third Modification)

Figure 8:
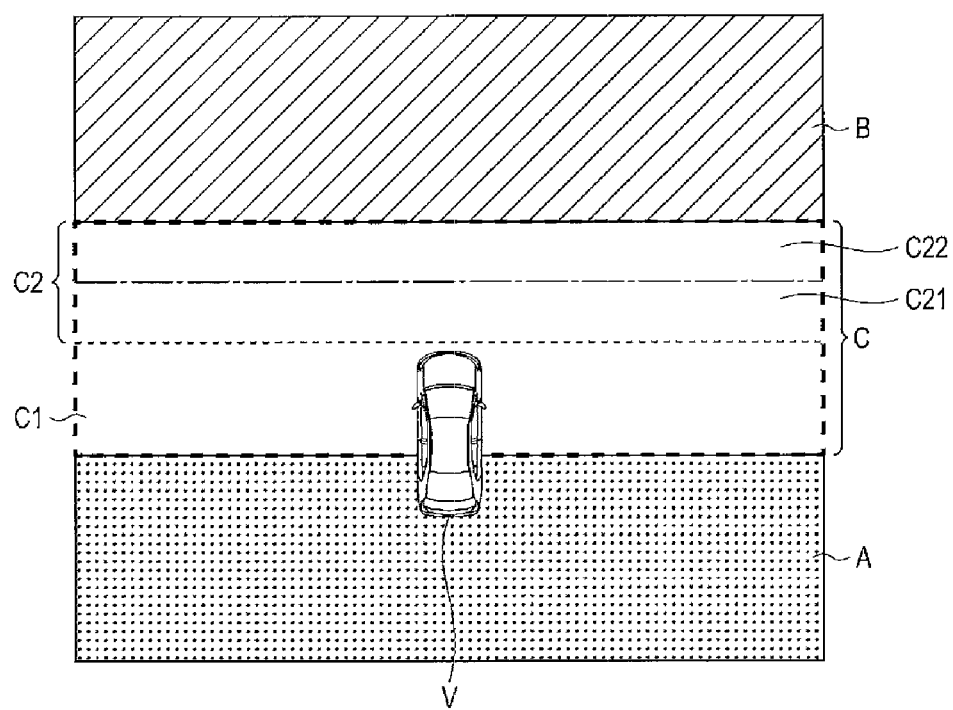
FIG. 8 shows an example of a plurality of partial areas in a third modification of the present disclosure.

While the exemplary embodiment has described a case where a sidewalk area is divided only once as an example, the sidewalk area may be divided a plurality of times. This case is described with reference to FIGS. 1, 7, and 8. FIG. 8 shows a state where controller 122 determines that vehicle V can cross first partial area C1 and then vehicle V enters first partial area C1.

In FIG. 8, controller 122 further divides a sidewalk area between first partial area C1 where vehicle V is present and non-sidewalk area B (in an example of FIG. 8, second partial area C2) into a plurality of partial areas (sub-partial areas). For example, as shown in FIG. 8, controller 122 divides second partial area C2 into sub-partial area C21 and sub-partial area C22, and recognizes sub-partial area C21 and sub-partial area C22. In this case, it is determined whether a target object is present in sub-partial area C21 and then in sub-partial area C22.

While the number of divisions of second partial area C2 is 2, the number of divisions may be equal to or larger than 3.

When a plurality of partial areas are set between the partial area vehicle V enters and non-sidewalk area B, the partial areas may be handled as one partial area and this partial area may be further divided. For example, when vehicle V enters first partial area C1 in FIG. 4, second partial area C2 and third partial area C3 may be handled as one partial area, and this partial area may be divided into a predetermined number.

A position of a target object or a number of target objects may change in second partial area C2 before vehicle V enters first partial area C1. In such a case, according to the present modification, after vehicle V crosses first partial area C1, second partial area C2 is further divided into a plurality of partial areas and it is determined whether the target object is present in these partial areas. It is thus possible to make a determination based on a change in a state of sidewalk area C.

The modifications of the present disclosure have been described above. The modifications may be implemented in any combination.

Figure 9:
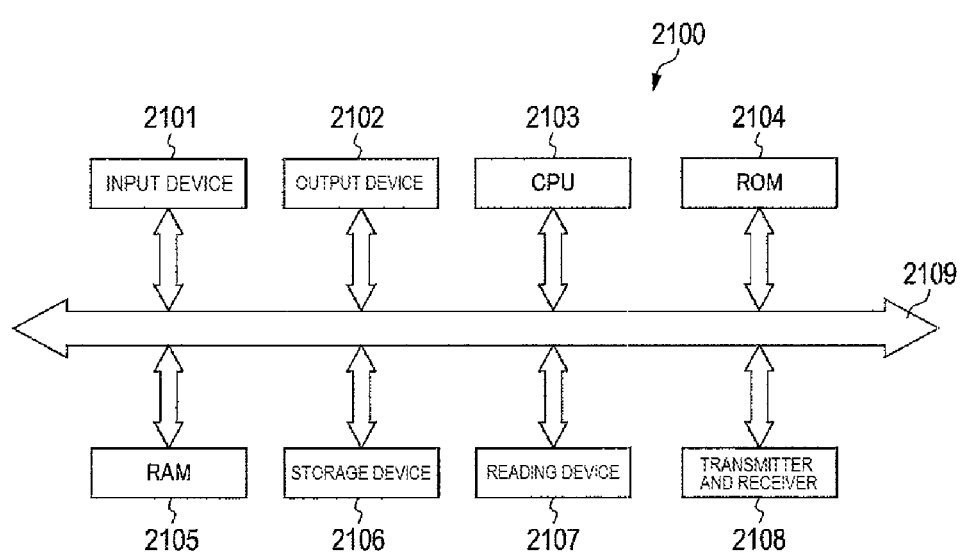
FIG. 9 shows a hardware configuration of a computer that implements functions of components by programs.

Functions of components in the exemplary embodiment and the modifications may be implemented by programs. FIG. 9 shows an example of a hardware configuration of a computer in such a case.

As shown in FIG. 9, computer 2100 includes input device 2101 such as an input button or a touch pad, output device 2102 such as a display or a speaker, CPU (Central Processing Unit) 2103, ROM (Read Only Memory) 2104, and RAM (Random Access Memory) 2105. Computer 2100 also includes storage device 2106 such as a hard disk device or an SSD (Solid State Drive), reading device 2107 for reading information from a recording medium such as a DVD-ROM (Digital Versatile Disk Read Only Memory) or a USB (Universal Serial Bus) memory, and transmitter and receiver 2108 that performs communication through a network. The respective components are interconnected with bus 2109.

Reading device 2107 reads a program for implementing the functions of the respective components from the recording medium having the program recorded therein, and storage device 2106 stores the program. Alternatively, transmitter and receiver 2108 performs communication with a server device connected to the network, and the program for implementing the functions of the respective components, the program having been downloaded from the server device, is stored in storage device 2106.

CPU 2103 then copies the program stored in storage device 2106 on RAM 2105, sequentially reads commands included in the program from RAM 2105, and performs the read commands, whereby the functions of the respective components are implemented. When the program is performed, RAM 2105 or storage device 2106 stores information obtained by the various processes described in the exemplary embodiment and the modifications for appropriate use.

INDUSTRIAL APPLICABILITY

The determination device, the determination method, and the determination program according to the present disclosure are useful to the whole technique of making determinations relating to traveling of a vehicle when the vehicle crosses a sidewalk.

REFERENCE MARKS IN THE DRAWINGS 100 driving assistance system
110 recognizer
120 determination device
121 input unit
122 controller
130 vehicle control device
140 storage device
2100 computer
2101 input device
2102 output device
2103 CPU
2104 ROM
2105 RAM
2106 storage device
2107 reading device
2108 transmitter and receiver
2109 bus

The invention claimed is:

1. A determination system, comprising:
a processor that receives information on a sidewalk area and information on a target object recognized in the sidewalk area, the sidewalk area extending along and adjacent a side of a road or a side of a street and being between a position where a vehicle is present and the side of the road or the side of the street;
the processor that (i) divides the sidewalk area into a plurality of partial areas including at least a first partial area and a second partial area based on the information on the sidewalk area, the second partial area extending along and adjacent the side of the road or the side of the street, the first partial area extending along and adjacent one of the plurality of partial areas, the first partial area and the second partial area each further extending perpendicular to a direction in which the vehicle is to cross the sidewalk area, the first partial area being closest to the vehicle among the plurality of partial areas, and the second partial area being adjacent to the side of the road or the side of the street, and (ii) determines, based on the information on the target object, at least one partial area among the plurality of partial areas to be a range where the vehicle is allowed to enter; and a vehicle controller that controls one of the vehicle to enter the at least one partial area or a display to indicate the vehicle is allowed to enter the at least one partial area.

2. The determination system according to claim 1, wherein the processor receives the information on the sidewalk area from at least one of a camera, a sensor, or radar that detects information for distinguishing between the sidewalk area and the side of the road or the side of the street.

3. The determination system according to claim 1, wherein the processor receives the information on the sidewalk area from a memory that stores a map database, the map database including the information about the sidewalk area.

4. The determination system according to claim 1, wherein the processor determines a number of divisions of the sidewalk area based on a length of the sidewalk area in the direction in which the vehicle is to cross the sidewalk area.

5. The determination system according to claim 1, wherein
after the vehicle enters the at least one partial area determined by the processor, the processor further (i) divides a part of the sidewalk area between the at least one partial area the vehicle has entered and the side of the road or the side of the street into a plurality of sub-partial areas, and (ii) determines at least one sub-partial area among the plurality of sub-partial areas to be a second range where the vehicle is allowed to enter.

6. The determination system according to claim 1, wherein the vehicle controller controls the vehicle to enter the first partial area, when the range which the processor determines includes the first partial area.

7. The determination system according to claim 1, wherein the at least one partial area includes the first partial area.

8. A determination method, comprising:
receiving information on a sidewalk area and information on a target object recognized in the sidewalk area, the sidewalk area extending along and adjacent a side of a road or a side of a street and being between a position where a vehicle is present and the side of the road or the side of the street;
dividing the sidewalk area into a plurality of partial areas including at least a first partial area and a second partial area based on the information on the sidewalk area, the second partial area extending along and adjacent the side of the road or the side of the street, the first partial area extending along and adjacent one of the plurality of partial areas, the first partial area and the second partial area each further extending perpendicular to a direction in which the vehicle is to cross the sidewalk area, the first partial area being closest to the vehicle among the plurality of partial areas, and the second partial area being adjacent to the side of the road or the side of the street;
determining, based on the information on the target object, at least one partial area among the plurality of partial areas to be a range where the vehicle is allowed to enter; and
controlling, by a processor, one of the vehicle to enter the at least one partial area or a display to indicate the vehicle is allowed to enter the at least one partial area.

9. A determination device, comprising:
a processor; and
a memory including a program that, when executed by the processor, causes the processor to perform operations, the operations including:
receiving information on a sidewalk area and information on a target object recognized in the sidewalk area, the sidewalk area extending along and adjacent a side of a road or a side of a street and being between a position where a vehicle is present and the side of the road or the side of the street;
dividing the sidewalk area into a plurality of partial areas including at least a first partial area and a second partial area based on the information on the sidewalk area, the second partial area extending along and adjacent the side of the road or the side of the street, the first partial area extending along and adjacent one of the plurality of partial areas, the first partial area and the second partial area each further extending perpendicular to a direction in which the vehicle is to cross the sidewalk area, the first partial area being closest to the vehicle among the plurality of partial areas, and the second partial area being adjacent to the side of the road or the side of the street;
determining, based on the information on the target object, at least one partial area among the plurality of partial areas to be a range where the vehicle is allowed to enter; and
controlling one of the vehicle to enter the at least one partial area or a display to indicate the vehicle is allowed to enter the at least one partial area.

* * * * *